Patented Aug. 29, 1933

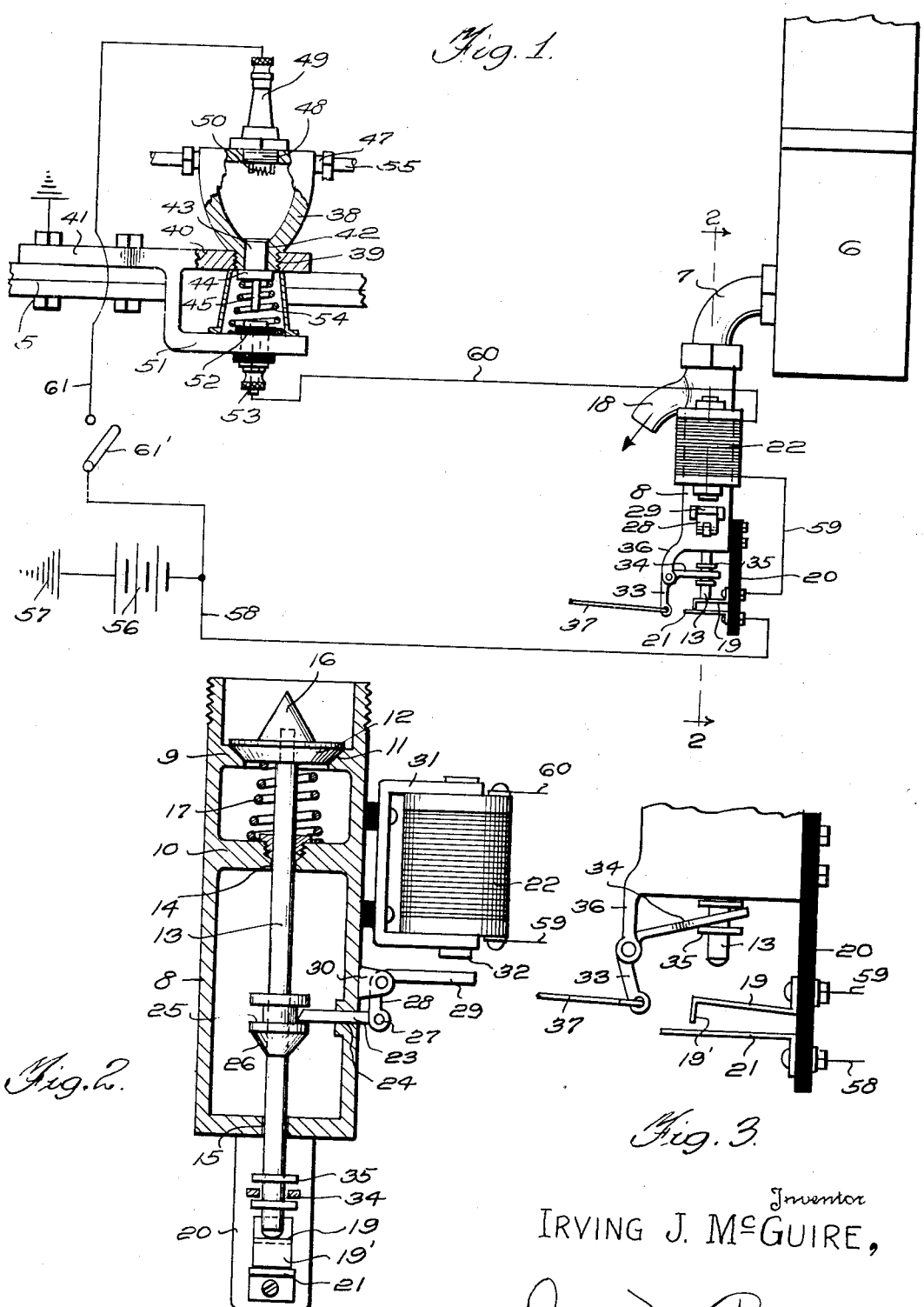

1,924,251

UNITED STATES PATENT OFFICE 1,924,251

AUTOMATIC DRAIN VALVE

Irving J. McGuire, Dolgeville, N. Y.

Application October 6, 1932. Serial No. 636,569

2 Claims. (Cl. 137—34.3)

This invention relates to automatic drain valves for water systems containing water, and has for its object to promptly and completely drain such systems in the event of a freezing temperature.

The freezing of water systems, such as the well known motor vehicle cooling systems or the like, has resulted in enormous damage costs, and it is to avoid such freezing, due in part to lack of prompt attention and in many cases the rapid fall in temperature, by providing means whereby the entire system may be drained at a given point, and before the main body of liquid has become sufficiently cold to start freezing.

An object of the present invention is the provision of a valve so constructed that mechanism carried thereby will be actuated upon the lowering of the temperature to the freezing point, such mechanism acting to drain the system to which the valve is connected.

A further object is to provide such a valve, having mechanism which, upon being actuated, instantaneously opens a valve for a complete drainage of the system before the liquid in such system has started to freeze.

A further object is the provision of a drain valve adapted to be actuated upon the closing of an electric circuit, and so constructed as to insure of a positive opening and drainage of the system with a minimum of electrical energy.

Another and important object of the invention resides in a simplified structure of drain valve having electrical release means of relatively small capacity and spring means for moving the valve to open position.

It is also contemplated to provide a valve of the above mentioned characteristics having means for forcing an opening through sediment or corrosion that may have accumulated in the drain coupling, thus insuring of a positive draining of the system.

Other important objects and advantages of the invention will be observed during the course of the following description, reference being had to the accompanying drawing.

In the drawing,

Figure 1 is a partly diagrammatic view of a drain valve and associated actuating means in use, Figure 2 is an enlarged vertical section of the drain valve, taken on line 2—2 of Figure 1 and, Figure 3 is a fragmentary side elevation of the lower end of the drain valve structure shown in Figure 1, with parts moved to drain position.

In the drawing, is fragmentarily illustrated a part of a motor vehicle engine 5, and the lowermost part of its cooling radiator 6. The radiator is provided with the conventional drain coupling 7, preferably in the form of a downturned L. The coupling 7 has suitable water-tight connection with the upper screw-threaded end of a valve casing 8 of tubular formation. The casing 8 is provided with horizontal partitions 9 and 10, the partition 9 having a relatively large opening forming a valve seat 11, adapted to co-act with a beveled valve 12. The valve 12 is carried by a stem 13, passing downwardly through an opening 14 in the partition 10 and through an opening 15 in the bottom wall of the casing. The stem is adapted to partake of vertical sliding movement through the partition 10 and bottom wall. A packing gland is preferably employed in the partition 10.

As clearly shown, the stem 13 projects a substantial distance below the bottom wall of the casing. The valve 12 is provided with a conical projection 16 upon its upper face which serves as a means for piercing any sediment or corrosion that may collect upon the top of the valve. The valve is normally projected to open position by a compressible coil spring 16', surrounding the valve stem and bearing against the underside of the valve and the partition 10. The space between the partitions 9 and 10 serves as a discharge chamber, and the casing adjacent the chamber is provided with a discharge spout 18, see Figure 1.

In the closed position, the lower end of the stem 13 bears against and depresses a spring contact strip 19 that is bolted to an insulating plate 20, carried by the casing 8. The depression of the strip 19 causes a downturned end 19' to bear against a second contact strip 21 also bolted to the plate 20. The strips 19 and 21 serve as circuit makers and breakers for an actuating magnet 22, to be described.

Means are provided for retaining the valve in closed position against the action of the spring 17, comprising a reciprocatory latch pin 23, having sliding movement through an opening 24 in the side wall of the casing. Normally, the free end of the pin is adapted to engage over a shoulder 25, formed upon the stem 13. The shoulder 25 has a downwardly extending beveled portion 26 serving as a means to guide the end of the pin 23 to latching position. The pin 23 has a loose connection at 27 with one arm 28 of a bell-crank lever 29. The lever 29 is in turn pivotally mounted within brackets 30 carried by the casing 8.

The magnet 22, see Figure 2, is rigidly mounted upon the casing 8 in an insulated bracket 31, and has its armature 32 positioned directly over, but spaced from the lever 29. It will thus be seen, that upon energization of the magnet 22, the free arm of the lever 29 will be swung upward, resulting in the retraction of the pin 23, and releasing the valve stem 13, at which time the valve 12 is instantly moved to open position. Immediately the stem 13 moves upward, pressure is relieved from the strip 19, whereupon it springs upward to the position shown in Figure 3, and serves to interrupt the flow of current to the magnet.

Means are provided to reset the valve and latch manually, comprising a bell-crank lever 33 having one arm forked as at 34, for engagement between a pair of spaced collars 35, rigid upon the lower end of the stem 13. The lever 33 is pivotally supported upon a bracket 36. A wire or cable 37 has connection with the free arm of the lever 33 and passes to the driver's compartment of the vehicle or other place of convenience. Pulling upon the wire 37 will result in swinging the lever 33 about its pivot and cause the stem 13 to move downwardly under the action of the forked arm engagement with the collars 34. The collars also serve as a limit means for the upward movement of the stem.

Means are provided for actuating the valve device through the medium of the magnet 22, comprising a metallic pressure chamber 38 of cup-like formation, the walls of which are relatively thick. The lower or reduced end of the chamber 38 is screw-threaded for engagement within a threaded opening 39 of one arm 40 of a supporting bracket 41. The lower end of the chamber is provided with a relatively large, smooth bore 42 for the reception of a reciprocatory plug 43 having a relatively large head 44, and a depending shank 45. The plug 43 has a snug sliding fit in the bore 42, providing a fluid tight stop. The chamber preferably has a flat top 46, and is provided with oppositely arranged threaded nipples 47, the bores of which communicate with the interior of the chamber. The top 46 has a centrally arranged screw-threaded opening 48 adapted to be engaged by the screw-threaded end of a heater element 49. The element 49 is in the nature of a conventional spark plug, excepting that its sparking points are connected by a heater wire 50.

The bracket 41 is provided with a second arm 51, spaced from, but parallel with the arm 40. The arm 51 carries a contact element 52, suitably insulated therefrom by an insulating bushing, and carries a suitable binding nut 53 below the arm 51, for connection with an electric wire, to be described. As clearly shown, in Figure 1, the shank 45 terminates just short of the contact 52 when the plug is in its normal position. A spring 54 normally urges the plug 43 upwardly to hold the shank 45 and contact 52 spaced.

Water circulating tubes 55 are connected with the nipples 47 for supplying water constantly to the chamber 38.

A source of electrical energy such as a conventional storage battery is indicated diagrammatically at 56. One side of the battery is grounded at 57 to the framework of the vehicle. A conductor wire 58 leads from the opposite side of the battery to one spring contact strip 21. A wire 59 has connection with the strip 19 and with one side of the magnet 22. A wire 60 leads from the opposite side of the magnet to the binding post 53 of the contact 52. The chamber 38 and its associated parts are suitably grounded to the frame of the vehicle. A conductor wire 61 has connection with the positive side of the battery and the heater element 49. A suitable switch 61 is interposed in this conductor.

In use, assuming the parts to be in the normal positions shown, as the temperature falls to the freezing point, the body of water contained in the chamber 38 being relatively small, will freeze readily, and the pressure created by the expansion of the ice will force the plug 43 downward until the shank 45 engages the contact 52. Current will then flow from the battery through wire 58, spring contact strips 21 and 19, wire 59, through the winding of the magnet 22, wire 60, contact 52, plug 43 and back to the opposite side of the battery through the ground, resulting in the energization of the magnet 22 and the releasing of the latch pin 23 through the medium of the bell-crank lever 28. Immediately the valve is released, the upward movement of the stem permits the strips 19 and 21 to separate, thus interrupting the flow of current. Operation of the switch 61 will cause current to flow through the heater 49 to melt the ice in the chamber 38 and permit parts to move to normal positions. The resetting of the valve takes place manually as heretofore described.

It is to be understood that the form of my invention herewith shown and described, is to be taken as the preferred example of the same, and that various changes in the shape, size and arrangement of parts may be resorted to without departing from the spirit of the invention or the scope of the subjoined claims.

Having described my invention, what I claim is:

1. A drain valve for water systems operable under the influence of a freezing temperature comprising an electric circuit closer and an electric circuit, a reciprocatory valve having a stem, a spring for projecting said valve to drain position, latch means engageable with said stem for retaining said valve in retracted position, an electric magnet for operating said latch, separable spring contacts engageable by said stem for completing a circuit to said magnet, said spring contacts adapted to separate and interrupt the circuit to said magnet upon the energization thereof for releasing of said valve and means for resetting said valve to latched position.

2. A valve of the character described comprising a tubular casing having a valve seat and a discharge chamber, a discharge spout for said chamber, a valve engageable with said seat and having a stem extending through said casing, a shoulder carried by said stem intermediate its ends and having a downwardly tapered portion, a latch operable through said casing and adapted to engage said shoulder, a bell-crank lever for retracting said latch, an electric magnet for operating said lever, an insulated plate carried by said casing and projecting therebelow, a pair of separable spring contacts carried by said plate, said contacts normally held in engagement with each other by the lower end of said stem, said contacts adapted to separate upon the energization of said magnet and the release of said valve, a spring for projecting said valve upon the release of said latch, spaced collars carried adjacent the lower end of said stem and engageable by a bell-crank lever for resetting said valve to latched position and a conical member carried by the upper face of said valve for piercing foreign matter upon the upper side of said valve, substantially as shown and described.

IRVING J. McGUIRE.